US007519445B2

(12) United States Patent
Botvinnik et al.

(10) Patent No.: US 7,519,445 B2
(45) Date of Patent: Apr. 14, 2009

(54) METHOD AND APPARATUS FOR DETERMINING A SOLUTION GROUP OF PARTS IN AN ASSEMBLY

(75) Inventors: Alex Botvinnik, Deerfield, IL (US);
Michael R. Holle, Kent, WA (US);
Deborah L. Hartley, Bellevue, WA (US)

(73) Assignee: Boeing Company, Chicago, IL (US)

( * ) Notice: Subject to any disclaimer, the term of this patent is extended or adjusted under 35 U.S.C. 154(b) by 246 days.

(21) Appl. No.: 11/523,196

(22) Filed: Sep. 18, 2006

(65) Prior Publication Data
US 2008/0125894 A1   May 29, 2008

Related U.S. Application Data

(60) Provisional application No. 60/840,221, filed on Aug. 25, 2006.

(51) Int. Cl.
*G06F 19/00* (2006.01)
*G06Q 10/00* (2006.01)
(52) U.S. Cl. .................... 700/106; 705/28
(58) Field of Classification Search ................ 700/106; 705/28; 706/904
See application file for complete search history.

(56) References Cited

U.S. PATENT DOCUMENTS

| 4,669,812 | A  | * | 6/1987  | Hoebing ........................ 359/9 |
| 6,535,769 | B1 | * | 3/2003  | Konar ........................... 700/14 |
| 7,171,625 | B1 | * | 1/2007  | Sacchi .......................... 715/754 |
| 2005/0230516 | A1 | * | 10/2005 | Carver et al. ................. 244/1 R |
| 2006/0227130 | A1 | * | 10/2006 | Elchuri ........................ 345/419 |

* cited by examiner

*Primary Examiner*—Albert DeCady
*Assistant Examiner*—Thomas H Stevens
(74) *Attorney, Agent, or Firm*—Law Office of Donald D. Mondul

(57) ABSTRACT

A method for determining a solution group of parts among a plurality of parts in an assembly, the solution group being situated substantially proximate to at least one target part of the plurality of parts, each respective part of the plurality of parts being identified by a respective part volume and a respective locus, each respective part volume substantially containing a respective part and each respective locus being identified with respect to an origin, includes the steps of: (a) Identifying a target volume substantially containing the at least one target part. (b) Identifying each respective part volume for each relevant part. Each relevant part is identified by a respective part volume having a predetermined relationship with respect to the target volume. (c) Assigning each relevant part to the solution group.

20 Claims, 5 Drawing Sheets

METHOD AND APPARATUS FOR DETERMINING A SOLUTION GROUP OF PARTS IN AN ASSEMBLY

This application claims benefit of prior filed copending Provisional Patent Application Ser. No. 60/840,221, filed Aug. 25, 2006.

BACKGROUND OF THE INVENTION

The present invention is directed to systems effecting virtual representation of complex assemblies, and especially to identifying particular parts in an assembly represented by such a system.

There are existing software programs that identify individual parts within an assembly in an on-line format amenable to manipulation. The prior art programs of this type are substantially focused upon a manufacturing environment, permitting substantially automatic generation of materials lists required for producing an assembly. Other related reports and lists may be produced using such programs as well.

However, the manufacturing process intended application of such prior art on-line systems and apparatuses results in a user having to access the entire system to identify a small solution group of parts within the assembly. By way of example and not by way of limitation, in the case of an on-line manufacturing system and apparatus appropriate for assembly or manufacturing of an airplane, a user desiring to identify a solution group of parts bounding an identified group of parts must load the entire parts catalog of the system encompassing the entire airplane in order to conduct a search for the solution group. Further, because of the manufacturing-related nature of the system and apparatus, the user likely needs to also know the process flow and the layout of the finished assembly in order to effect the exemplary desired search. In the case of a large complex commercial aircraft, loading the on-line descriptions for an entire parts inventory is too large for most computers available for such an inquiry, and the search must therefore be conducted by loading the parts inventory descriptions in sections. This is a cumbersome process that occupies computing assets unnecessarily and thus interferes with other processes for which the computing assets may be needed.

An example of when one may find it useful to locate a parts or parts near to or adjacent to an identified part or group of parts is when one seeks to verify, produce, amend or otherwise treat a repair manual or a service bulletin. Having to use the cumbersome process previously available for searching among products of an assembly as described above would be awkward, inefficient and disruptive to manufacturing or other applications using the on-line parts inventory system and apparatus.

It would be advantageous if a user could access an on-line parts inventory system for the purpose of identifying a solution group of parts with respect to an identified target volume containing a part or a group of parts. The solution group may be comprised of relevant parts having a predetermined relationship with respect to the target volume. A method and apparatus providing such a capability for a user avoids having to load an entire parts inventory and use information relating to a process flow and layout of a finished assembly.

By way of example and not by way of limitation, using an on-line parts system defining a part-containing volume for substantially all parts in the on-line system with respect to an origin, such an advantageous system and apparatus permits a user to identify a target volume containing at least one target part, identify parts in the on-line parts system having a part-containing volume with a predetermined relationship with the target volume as relevant parts. Such an identification process may be carried out without loading the entire parts inventory for searching. The relevant parts may be included in the desired solution group for use, by way of example and not by way of limitation, in producing a service bulletin relating to parts contained within the target volume. Examples of a useful predetermined relationship between a part-containing volume and the target volume may include, by way of example and not by way of limitation, an abutting relationship between the two volumes or an overlapping relationship between the two volumes.

There is a need for a method and apparatus for determining a solution group of parts in an assembly that permits a user to effect identifying parts having a predetermined relationship with a target volume substantially containing a target part or a target group of parts.

SUMMARY OF THE INVENTION

A method for determining a solution group of parts among a plurality of parts in an assembly, the solution group being situated substantially proximate to at least one target part of the plurality of parts, each respective part of the plurality of parts being identified by a respective part volume and a respective locus, each respective part volume substantially containing a respective part and each respective locus being identified with respect to an origin, includes the steps of: (a) Identifying a target volume substantially containing the at least one target part. (b) Identifying each respective part volume for each relevant part. Each relevant part is identified by a respective part volume having a predetermined relationship with respect to the target volume. (c) Assigning each relevant part to the solution group.

An apparatus for determining a solution group of parts among a plurality of parts in an assembly, the solution group being situated substantially proximate to at least one target part of the plurality of parts, includes: (a) A storage unit storing information identifying each respective part of the plurality of parts by a respective part volume and a respective locus. Each respective part volume substantially contains at least one respective part. Each respective locus is identified with respect to an origin. (b) A computing unit coupled with the storage unit for accessing the storage unit to obtain and treat information stored in the storage unit. (c) An input unit for commanding the computing unit in effecting the accessing, using and treating. (d) An output unit coupled with the computing unit for presenting output signals from the computing unit. The computing unit and the input unit cooperate to identify a target volume substantially containing the at least one target part. The computing unit employs information stored in the storage unit for the treating to effect identifying each respective part volume for each relevant part. Each relevant part is identified by a respective part volume having a predetermined relationship with respect to the target volume. The computing unit assigns each relevant part to the solution group. The output unit presents the solution group to a user.

It is, therefore, an object of the present invention to provide a method and apparatus for determining a solution group of parts in an assembly that permits a user to effect identifying parts having a predetermined relationship with a target volume substantially containing a target part or a target group of parts.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
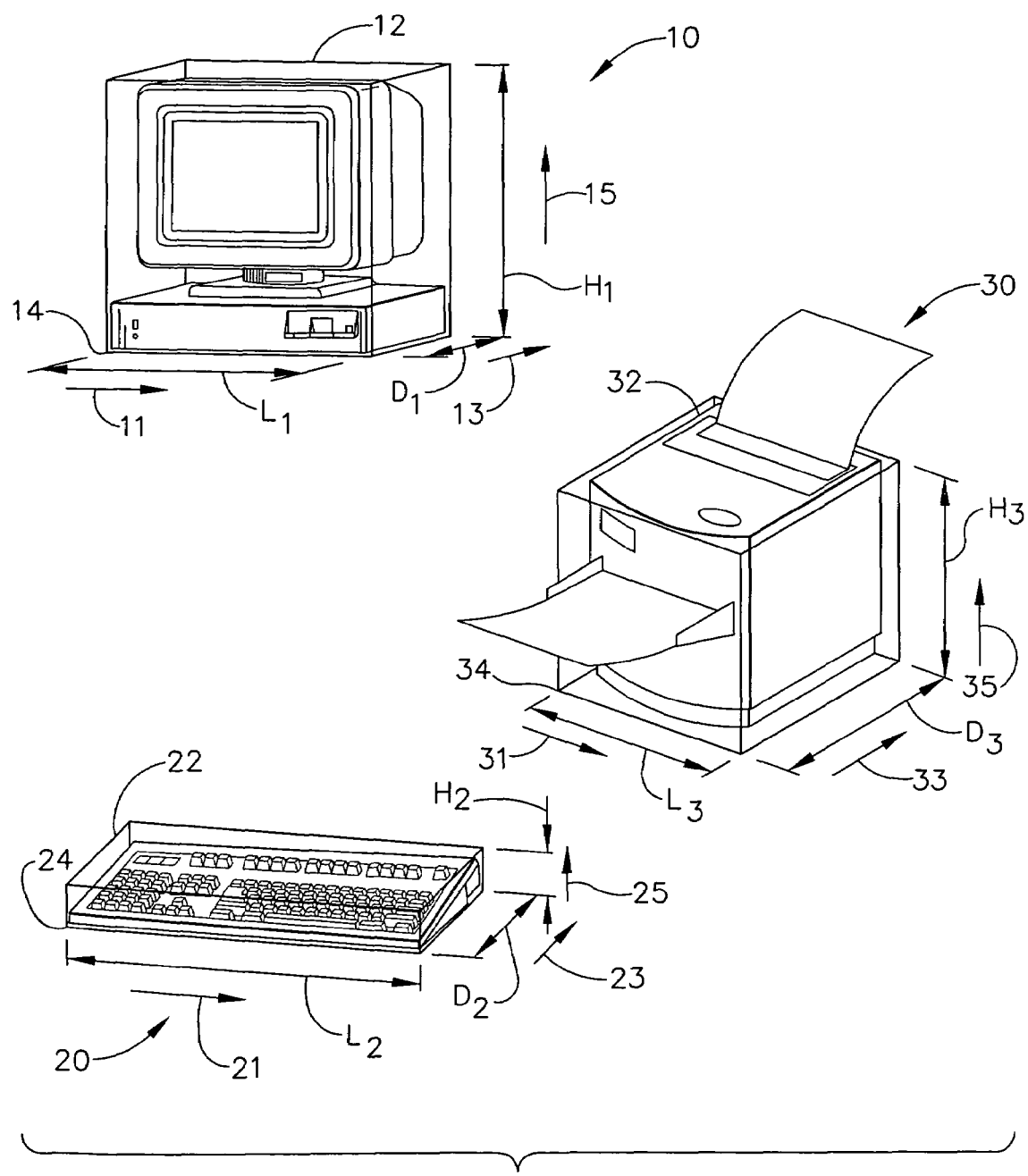
FIG. 1 presents perspective drawings of exemplary individual parts having representative polyhedral part-containing volumes.

FIG. 1 presents perspective drawings of exemplary individual parts having representative polyhedral part-containing volumes. In FIG. 1, a processing unit 10 is illustrated with an associated part-containing volume 12. Part-containing volume 12 substantially contains processing unit 10. Part-containing volume 12 extends from a reference locus 14 in a first direction 11 for a length $L_1$, extends in a second direction 13 substantially perpendicular with direction 11 for a depth $D_1$, and extends in a third direction 15 substantially perpendicular with directions 11, 13 for a height $H_1$.

An input unit 20 is illustrated with an associated part-containing volume 22. Part-containing volume 22 substantially contains input unit 20. Part-containing volume 22 extends from a reference locus 24 in a first direction 21 for a length $L_2$, extends in a second direction 23 substantially perpendicular with direction 21 for a depth $D_2$, and extends in a third direction 25 substantially perpendicular with directions 21, 23 for a height $H_2$.

A printing unit 30 is illustrated with an associated part-containing volume 32. Part-containing volume 32 substantially contains printing unit 30. Part-containing volume 32 extends from a reference locus 34 in a first direction 31 for a length $L_3$, extends in a second direction 33 substantially perpendicular with direction 31 for a depth $D_3$, and extends in a third direction 35 substantially perpendicular with directions 31, 33 for a height $H_3$. As illustrated in FIG. 1, direction 31 is not necessarily parallel with directions 11, 21, direction 33 is not necessarily parallel with directions 13, 23 and direction 35 is not necessarily parallel with directions 15, 25.

Figure 2:
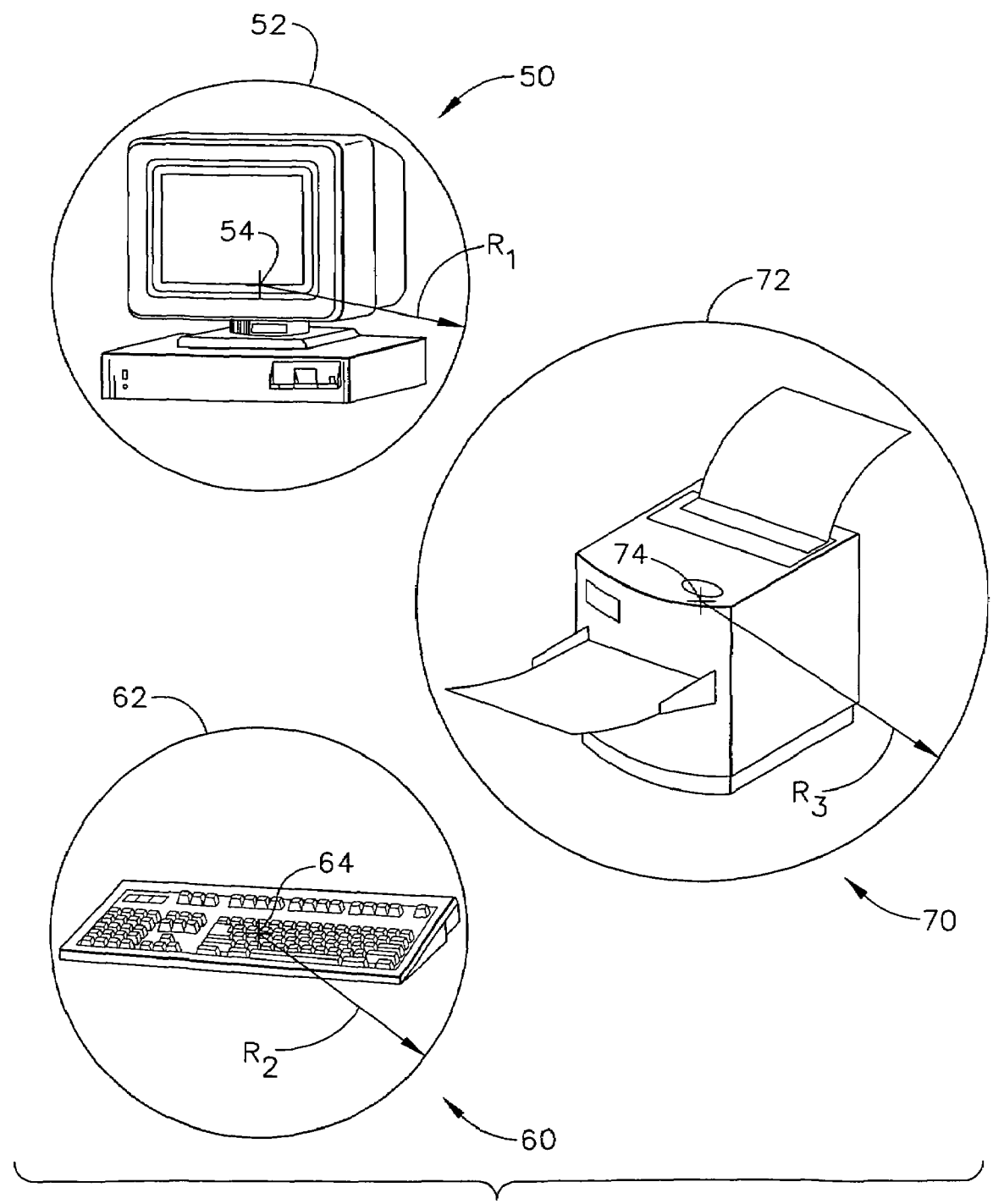
FIG. 2 presents perspective drawings of exemplary individual parts having representative spherical part-containing volumes.

FIG. 2 presents perspective drawings of exemplary individual parts having representative spherical part-containing volumes. In FIG. 2, a processing unit 50 is illustrated with an associated part-containing volume 52. Part-containing volume 52 substantially contains processing unit 50. Part-containing volume 52 is substantially spherical in shape, centered at a center locus 54 and having a radius $R_1$.

An input unit 60 is illustrated with an associated part-containing volume 62. Part-containing volume 62 substantially contains input unit 60. Part-containing volume 62 is substantially spherical in shape, centered at a center locus 64 and having a radius $R_2$.

A printing unit 70 is illustrated with an associated part-containing volume 72. Part-containing volume 72 substantially contains printing unit 70. Part-containing volume 72 is substantially spherical in shape, centered at a center locus 74 and having a radius $R_3$.

Figure 3:
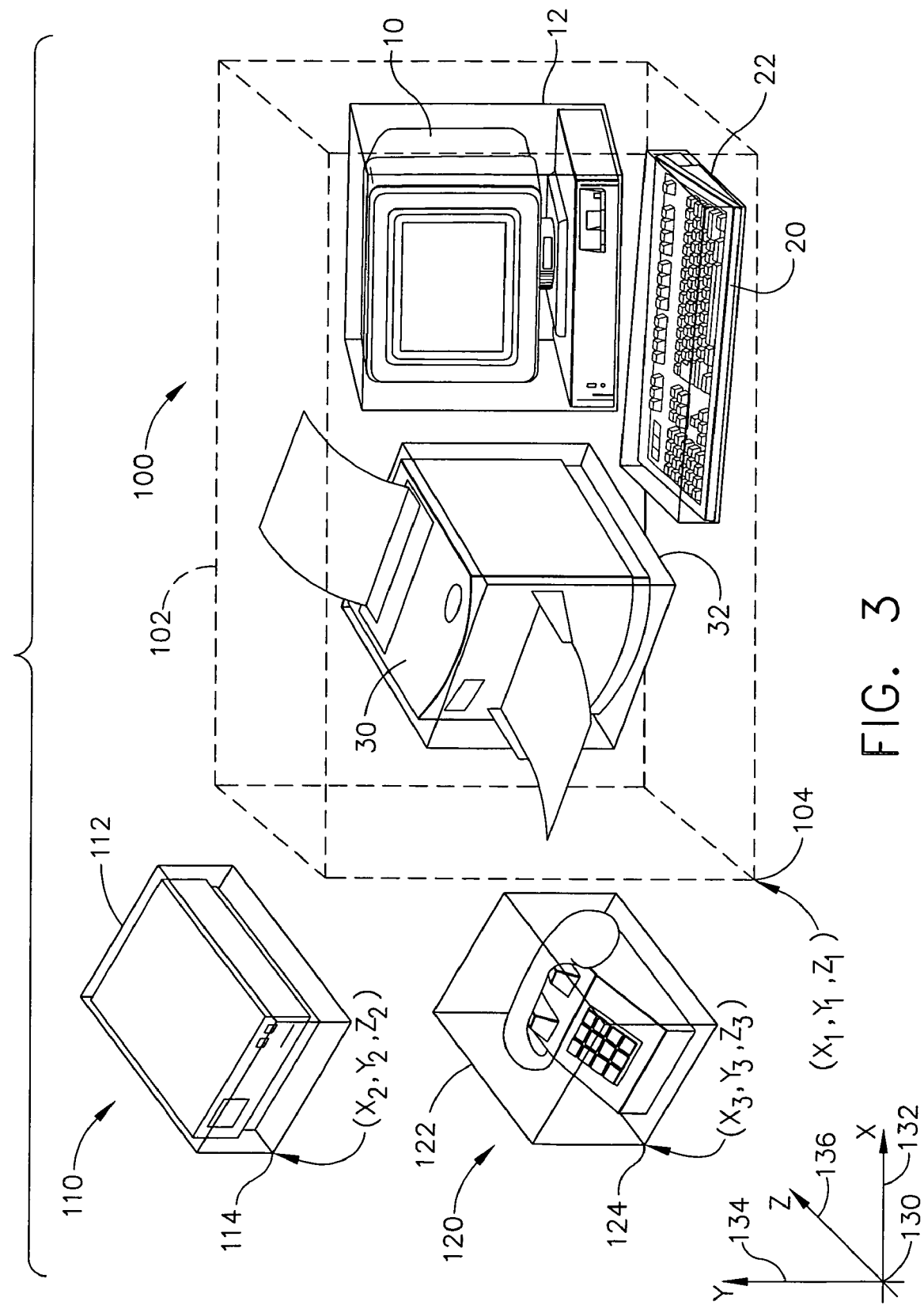
FIG. 3 illustrates a representative assembly including a polyhedral target volume containing the exemplary parts illustrated in FIG. 1 and associated proximate additional parts.

FIG. 3 illustrates a representative assembly including a polyhedral target volume containing the exemplary parts illustrated in FIG. 1 and associated proximate additional parts. In FIG. 3, a processing assembly 100 includes a processing unit 10, an input unit 20 and a printing unit 30. Processing unit 10 is contained in a part-containing volume 12 substantially containing processing unit 10. Input unit 20 is contained in a part-containing volume 22 substantially containing input unit 20. Printing unit 30 is contained in a part-containing volume 32 substantially containing printing unit 30.

Processing assembly 100 is substantially contained within a target volume 102. Target volume 102 substantially contains part-containing volumes 12, 22, 32. Target volume 102 is located with respect to an origin 130 and three axes; X-axis 132, Y-axis 134 and Z-axis 136. Axes 132, 134, 136 are substantially orthogonal and intersect substantially at axis 130. Target volume 102 has a reference locus 104 located substantially at a point defined by measurements along axes 132, 134, 136: $(X_1, Y_1, Z_1)$.

A modem unit 110 substantially contained within a part-containing volume 112 is situated near or proximate to target volume 102. Part-containing volume 112 has a reference locus 114 located substantially at a point defined by measurements along axes 132, 134, 136: $(X_2, Y_2, Z_2)$. A telephone unit 120 substantially contained within a part-containing volume 122 is also situated near or proximate to target volume 102. Part-containing volume 122 has a reference locus 124 located substantially at a point defined by measurements along axes 132, 134, 136: $(X_3, Y_3, Z_3)$.

The present invention ascertains target volume 102. If either of part-containing volumes 112, 122 has a predetermined relationship with target volume 102, the respective such related part 110, 120 is designated as a relevant part and is identified by the present invention as part of a solution group for a user. By way of example and not by way of limitation, the solution group may be sought by a user for use in a repair manual or in a service bulletin. By way of example and not by way of limitation, a predetermined relationship may be that one or both of part-containing volumes 112, 122 abuts or intersects target volume 102.

Figure 4:
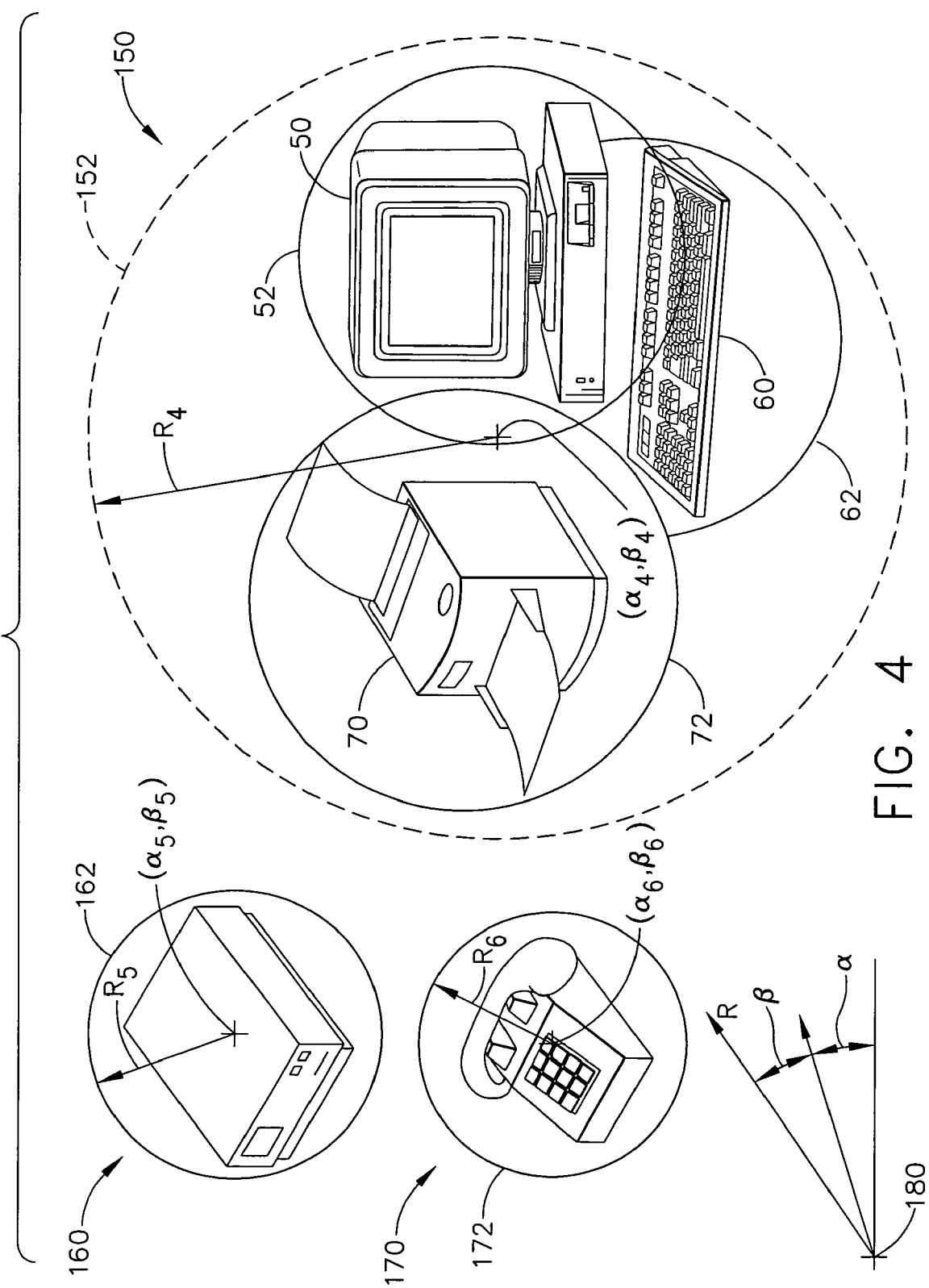
FIG. 4 illustrates a representative assembly including a polyhedral target volume containing the exemplary parts illustrated in FIG. 2 and associated proximate additional parts.

FIG. 4 illustrates a representative assembly including a polyhedral target volume containing the exemplary parts illustrated in FIG. 2 and associated proximate additional parts. In FIG. 4, a processing assembly 150 includes a processing unit 50, an input unit 60 and a printing unit 70. Processing unit 50 is contained in a part-containing volume 52 substantially containing processing unit 50. Input unit 60 is contained in a part-containing volume 62 substantially containing input unit 60. Printing unit 70 is contained in a part-containing volume 72 substantially containing printing unit 70.

Processing assembly 150 is substantially contained within a target volume 152. Target volume 152 substantially contains part-containing volumes 52, 62, 72. Target volume 152 is located with respect to an origin 180 and three polar coordinates: an angle α measured in a first plane, an angle β measured in a second plane substantially perpendicular with the first plane and a radius R (distance from origin 180). Target volume 152 has a center locus located substantially at a point defined by coordinates $(\alpha_4, \beta_4)$ and has a radius $R_4$.

A modem unit 160 substantially contained within a part-containing volume 162 is situated near or proximate to target volume 152. Part-containing volume 162 has a center locus located substantially at a point defined by coordinates ($\alpha_5, \beta_5$) and has a radius $R_5$. A telephone unit 170 substantially contained within a part-containing volume 172 is also situated near or proximate to target volume 152. Part-containing volume 172 has a center locus located substantially at a point defined by coordinates ($\alpha_6, \beta_6$) and has a radius $R_6$.

The present invention ascertains target volume 152. If either of part-containing volumes 162, 172 has a predetermined relationship with target volume 152, the respective such related part 160, 170 is designated as a relevant part and is identified by the present invention as part of a solution group for a user. By way of example and not by way of limitation, the solution group may be sought by a user for use in a repair manual or in a service bulletin. By way of example and not by way of limitation, a predetermined relationship may be that one or both of part-containing volumes 162, 172 abuts or intersects target volume 152.

Figure 5:
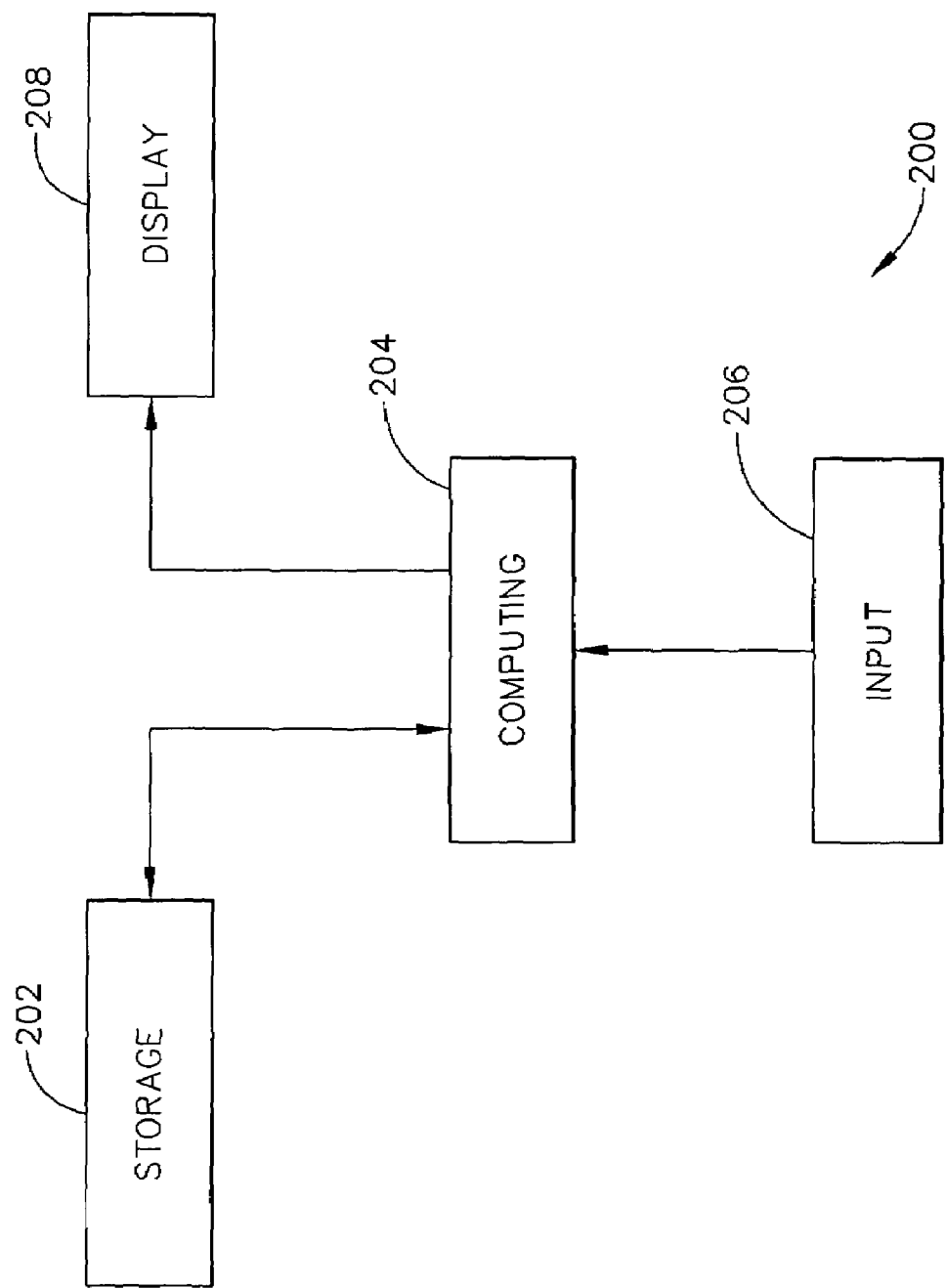
FIG. 5 is a schematic block diagram illustrating the apparatus of the present invention.

FIG. 5 is a schematic block diagram illustrating the apparatus of the present invention. In FIG. 5, an apparatus 200 for determining a solution group of parts among a plurality of parts in an assembly, the solution group being situated substantially proximate to at least one target part of the plurality of parts, includes a storage unit 202. Storage unit 202 stores information identifying each respective part of the plurality of parts by a respective part volume and a respective locus. Each respective part volume substantially contains at least one respective the part. Each respective locus is identified with respect to an origin. Apparatus 200 further includes a computing unit 204 coupled with storage unit 202 for accessing storage unit 202 to obtain and treat information stored in storage unit 202.

Apparatus 200 further includes an input unit 206 for commanding computing unit 204 in effecting the accessing, using and treating of information from storage unit 202. Apparatus 200 further includes an output unit 208 coupled with computing unit 204 for presenting output signals from computing unit 204.

Computing unit 204 and input unit 206 cooperate to identify a target volume substantially containing at least one target part. Computing unit 204 employs information stored in storage unit 202 for the treating to effect identifying each respective part volume for each relevant part. Each relevant part is identified by a respective part volume having a predetermined relationship with respect to the target volume. Computing unit 204 assigns each relevant part to the solution group. Output unit 208 presents the solution group to a user.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for determining a solution group of relevant parts among a plurality of parts in an assembly; said solution group being related with at least one target part of said plurality of parts; each respective part of said plurality of parts being identified by a respective part-containing volume and a respective locus; each said respective locus being identified with respect to a common origin; the method comprising the steps of:

(a) identifying said respective part-containing volume of each respective said at least one target part;
    (b) including each said respective part-containing volume of each respective said at least one target part as part of a target-containing volume for said at least one target part;
    (c) identifying each respective part-containing volume for each said relevant part; each said relevant part being identified by a respective part-containing volume having a predetermined relationship with respect to said target-containing volume; and
    (d) assigning said relevant part to said solution group.

2. A method for determining a solution group of relevant parts among a plurality of parts in an assembly as recited in claim 1 wherein each said respective locus is defined according to three substantially orthogonal axes substantially originating at said common origin.

3. A method for determining a solution group of relevant parts among a plurality of parts in an assembly as recited in claim 1 wherein each said respective locus is defined according to a three dimensional polar coordinate system substantially centered at said common origin.

4. A method for determining a solution group of relevant parts among a plurality of parts in an assembly as recited in claim 1 wherein each said respective part-containing volume is substantially polyhedral.

5. A method for determining a solution group of relevant parts among a plurality of parts in an assembly as recited in claim 1 wherein each said respective part-containing volume is substantially spherical.

6. A method for determining a solution group of relevant parts among a plurality of parts in an assembly as recited in claim 1 wherein said predetermined relationship is a substantially abutting relationship between a respective said part-containing volume and said target-containing volume.

7. A method for determining a solution group of relevant parts among a plurality of parts in an assembly as recited in claim 1 wherein said predetermined relationship is a substantially intersecting relationship between a respective said part-containing volume and said target-containing volume.

8. A method for determining a solution group of relevant parts among a plurality of parts in an assembly as recited in claim 7 wherein each said respective part-containing volume is substantially polyhedral.

9. A method for determining a solution group of relevant parts among a plurality of parts in an assembly as recited in claim 7 wherein each said respective part-containing volume is substantially spherical.

10. A method for determining a solution group of relevant parts among a plurality of parts in an assembly; said solution group being situated substantially proximate to at least one target part of said plurality of parts; each respective part of said plurality of parts being identified by a respective part volume and a respective locus; each respective said part volume substantially containing a respective said part; each said respective locus being identified with respect to a common origin; the method comprising the steps of:

(a) identifying a target volume substantially containing said at least one target part;
    (b) identifying each respective part volume for each said relevant part; each said relevant part being identified by a respective part volume having a predetermined relationship with respect to said target volume; and
    (c) assigning each said relevant part to said solution group.

11. A method for determining a solution group of relevant parts among a plurality of parts in an assembly as recited in claim 10 wherein each said respective locus is defined according to three substantially orthogonal axes substantially originating at said common origin.

12. A method for determining a solution group of relevant parts among a plurality of parts in an assembly as recited in claim 10 wherein each said respective locus is defined according to a three dimensional polar coordinate system substantially centered at said common origin.

13. A method for determining a solution group of relevant parts among a plurality of parts in an assembly as recited in claim 10 wherein each said respective part volume is substantially a polyhedral shape.

14. A method for determining a solution group of relevant parts among a plurality of parts in an assembly as recited in claim 10 wherein each said respective part-containing volume is substantially a spherical shape.

15. A method for determining a solution group of relevant parts among a plurality of parts in an assembly as recited in claim 10 wherein said predetermined relationship is a substantially abutting relationship between a respective said part volume and said target volume.

16. A method for determining a solution group of relevant parts among a plurality of parts in an assembly as recited in claim 10 wherein said predetermined relationship is a substantially intersecting relationship between a respective said part volume and said target volume.

17. A method for determining a solution group of relevant parts among a plurality of parts in an assembly as recited in claim 16 wherein each said respective part volume is substantially a polyhedral shape.

18. A method for determining a solution group of relevant parts among a plurality of parts in an assembly as recited in claim 16 wherein each said respective part-containing volume is substantially a spherical shape.

19. An apparatus for determining a solution group of relevant parts among a plurality of parts in an assembly; said solution group being situated substantially proximate to at least one target part of said plurality of parts; the apparatus comprising:
(a) a storage unit; said storage unit storing information identifying each respective part of said plurality of parts by a respective part volume and a respective locus; each respective said part volume substantially containing at least one respective said part; each said respective locus being identified with respect to a common origin;
(b) a computing unit coupled with said storage unit for accessing said storage unit to obtain and treat information stored in said storage unit;
(c) an input unit for commanding said computing unit in effecting said accessing, using and treating; and
(d) an output unit coupled with said computing unit for presenting output signals from said computing unit;
said computing unit and said input unit cooperating to identify a target volume substantially containing said at least one target part; said computing unit employing information stored in said storage unit for said treating to effect identifying each respective part volume for each said relevant part; each said relevant part being identified by a respective part volume having a predetermined relationship with respect to said target volume; said computing unit assigning each said relevant part to said solution group; said output unit presenting said solution group to a user.

20. An apparatus for determining a solution group of relevant parts among a plurality of parts in an assembly as recited in claim 19 wherein said predetermined relationship includes at least one of a substantially abutting relationship and a substantially intersecting relationship.

* * * * *